United States Patent [19]

Acopulos

[11] Patent Number: 5,713,135
[45] Date of Patent: Feb. 3, 1998

[54] MULTI-PURPOSE CARPENTRY MEASURING DEVICE

[76] Inventor: Brad M. Acopulos, 84 Jagger La., West Hampton, N.Y. 11977

[21] Appl. No.: 550,618

[22] Filed: Oct. 31, 1995

[51] Int. Cl.$^6$ .............. G01B 3/56; G01B 7/30; B43L 7/10
[52] U.S. Cl. .............. 33/451; 33/1 PT; 33/286
[58] Field of Search .............. 33/451, 1 PT, 33/285, 286, 366, 384, 403, 452, 464, 465, 471, 472, 484, 485, DIG. 21

[56] References Cited

U.S. PATENT DOCUMENTS

| | | | |
|---|---|---|---|
| 840,628 | 1/1907 | Johnson | 33/471 |
| 1,014,402 | 1/1912 | Larsen | 33/465 |
| 1,585,563 | 5/1926 | Schlattau | 33/471 |
| 2,743,528 | 5/1956 | Posthauer, Sr. | 33/375 |
| 3,522,657 | 8/1970 | Metrulis | 33/485 |
| 3,897,637 | 8/1975 | Genho | 33/DIG. 21 |
| 4,442,606 | 4/1984 | Graham et al. | 33/471 |
| 4,481,720 | 11/1984 | Sury | 33/452 |
| 4,932,132 | 6/1990 | Baker et al. | 33/366 |
| 5,103,569 | 4/1992 | Leatherwood | 33/384 |
| 5,134,780 | 8/1992 | Butler et al. | 33/366 |

*Primary Examiner*—Christopher W. Fulton
*Attorney, Agent, or Firm*—W. Patrick Quast, Esq.

[57] ABSTRACT

A multi-purpose carpentry measuring device is described. The tool combines the functions of a framing square, level and plum bob in one function and with just one measurement. Further, the tool can also be used as a bevel gauge and a level bench marker. A foot and leg member, joined by a pivot, contain bubble tubes for all necessary horizontal and vertical level measurements. Extendible rules on both members further increase the usefulness of the device. The tool has a built-in magnetic disc and bar code reader for continuously displaying angular read out on an integral calculator. Laser pin lights at either end of the tool allow for laser precision in all level bench marker observations as may be facilitated by a positioning pin disposed in said device.

11 Claims, 6 Drawing Sheets

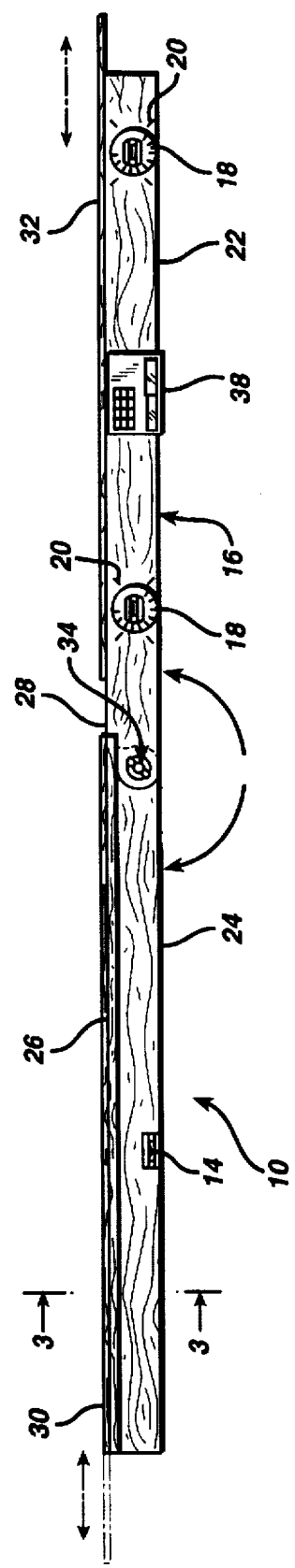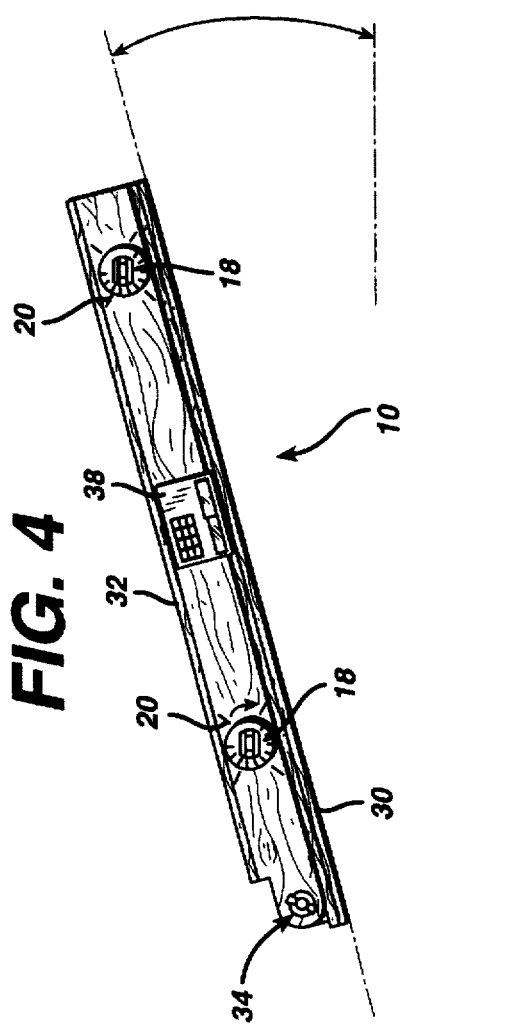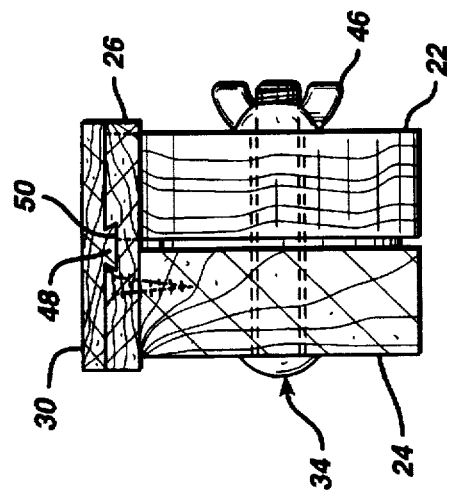

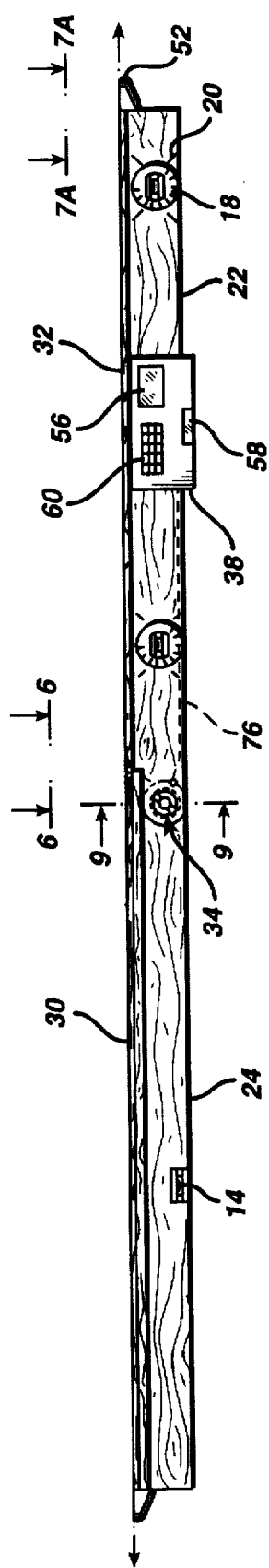
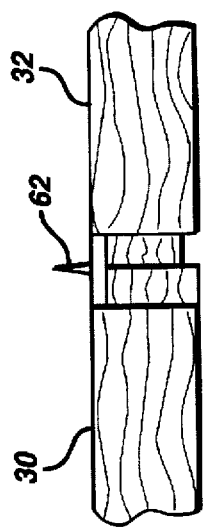
FIG. 5
FIG. 6

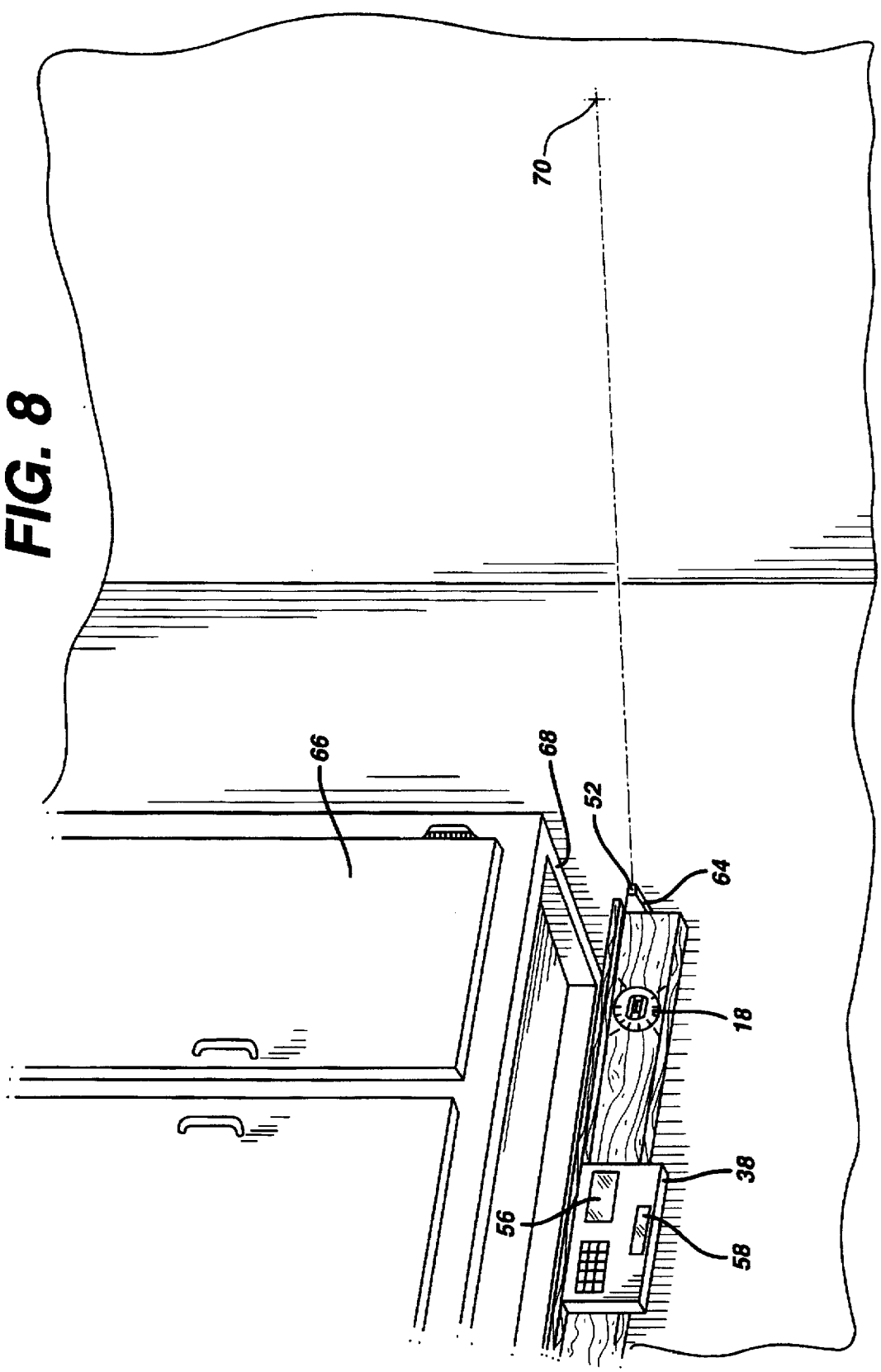

MULTI-PURPOSE CARPENTRY MEASURING DEVICE

BACKGROUND

This invention relates to carpentry measuring devices, and in particular to a tool combining a number of important carpentry measuring tools, including the bevel gauge, level, straight edge, framing square, plumb, and bench marker.

In constructing a typical building, as, for example, a home, carpenters and other building professionals employ a variety of measuring devices essential to insure the correct placement of the foundation, side walls, floors, roof, and window and door placements. Typically to this end, it is important to ascertain if structures are level in a horizontal plane, and plumb in a vertical line in relation to a horizontal plane. Also a variety of angles, including non-square angles, must be accurately measured. Multiple calculations are required from data supplied by these tools so that structures are placed correctly within a given foundation, windows and doors are inset with precision, the rise and pitch of a roof and all the required roofing carpentry calculated correctly, the accurate placement of stairs, so on. Tools usually employed include a variety of levels such as a two-foot, four foot, and six foot level; a line level; a water level; a plumb bob; a framing square; a level benchmarker; and a bevel gauge.

Obviously, while these tools admirably serve the building trades, they do not address the time saving conveniences obtained with the combination carpentry measuring tool of the invention. In addition to combining these important devices into a single tool, the invention also provides for extremely accurate and convenient digital read out of angles with the convenience of a built-in calculator at the ready for the many calculations continuously being required.

Further, the invention addresses the problem of providing a level bench marker for laser precision layout for the installation of cabinets, paneling and floors, and for the precision layout for foundations to houses and the framing of the walls afterwards.

Therefore, it is a primary object of the invention to provide a combination level, bevel gauge, straight edge, framing square, and plumb measuring tool.

An additional object of the invention is to provide a standard level that is extendable in length by unfolding said level.

A further object of the invention is to provide a framing square that enables the user to make certain that any opening in a structure is square and plumb at the same time.

Still another object of the carpentry measuring tool of the invention is to provide a bevel gauge for measuring angles including complex compound angles.

Another object of the carpentry measuring tool of invention is to provide a built-in calculator for conveniently and rapidly determining pitch, rise and run measurements, spans and other required construction calculations.

A further object of the invention is to provide a digital read out of angles being measured, and the orientation of the device measuring said angles from a position considered to be true level.

Still another object of the invention is to provide a laser light precision level bench marker for the installation of cabinets, paneling, leveling out of walls, ceilings and floors, and for the precision layout for foundations to houses, and the framing of walls afterwards.

SUMMARY

These and other objects are obtained in the instant invention of a multi-purpose carpentry measuring device.

It has been found that the functions of the typical level, straight edge, framing square, and plumb bob can be combined into one measuring device with resultant time saving conveniences for the user. Typically, a level is a straight length of wood or metal having a glass or plastic vial containing a bubble suspended in either alcohol or ether to indicate when the device is in a true horizontal position or true vertical position relative to a known surface. In the instant invention, two similar levels are connected at one end of each level by a pivot. The first level referred to as the "foot" has a fixed bubble tube located at approximately the center along the length of the foot to be used for horizontal measurements. The second level referred to as the "leg" contains at least one and preferably two bubble tubes either in a fixed, or preferably in a rotatable position as will be more fully explained, located a spaced distance apart along the length of the leg, to be used for vertical measurements. The foot and the leg are configured to fit together in a closed position, with both the foot and the leg having a flat base portion and upstanding side walls so that when they fit together in said closed position, they take the shape of a long, rectangularly shaped box. When manually lifted apart, the pivot maintains the foot and leg members in a planar relationship, the junction of the leg and the foot at the pivot being configured so as to limit their extension one from another to a maximum of 180 degrees. A device, such as a wing nut, acting as the pivot, can serve to lock the foot and leg at any given angle between the closed 0 degrees and fully open 180 degrees. A rule(s) that is approximately the same length as either the foot or the leg member can be externally affixed to the base portion of either or both members by means of, for example, a tongue in groove joint. The device is envisioned as being supplied, as when in the closed position, in a one foot size, a two foot size, and a four foot size. Therefore, in its open position at 180 degrees, the device becomes either a two foot, four foot or eight foot level or straight edge.

The device of the invention can further serve as a precision bevel gauge or bevel square (an adjustable tool for measuring and laying out angles) by adding angle indicating grooves on the leg member at the pivot junction of the leg member and the foot member. Significant convenience and precision is added to this angle determining operation, i.e., the angle between the two arms of the members in a given plane, by incorporating a calculating machine or calculator affixed to the leg member. The calculator is preferably battery operated, and is connected by an electric wire to a magnetic disc secured to the foot member at the pivot junction of the two members. An optical sensor located in the leg member at the pivot junction reads a bar code calibrated in angle degrees, which then provides for a digital read out on a display on the face of the calculator indicating the precise angle between the foot and the leg member. In addition, a magnetically positioned detectable bubble tube affixed to the calculator provides a digital read out on the calculator as to the orientation of the leg member relative to a position considered to be true level. Obviously, the calculator can serve as a general purpose calculating tool for the myriad of other calculations continuously being required in construction activities.

The device of the invention can also serve as a precision level bench marker. Installing a laser pin light at the ends of the foot and leg, opposite the pivot junction, now permits a precise marking to be made on walls, ceilings, and floors for precision determination of the relative position of one structure and another. The laser pin lights are preferably battery operated, retractable when not in use, and can be pivoted at a 45 degree angle up or down, or left and right. A retractable pin (collinear at its point with the laser pin lights when the laser pin lights are operating in the same planar relationship as the position of the leg member and foot member in fully open position) mounted at the center of the carpentry device when the two arms of the device are in fully open, 180 degree position, can be employed to affix the device to a structure and be balanced in a level position while an operator proceeds to mark the precise spots on adjacent walls illuminated by the laser.

The advantages of the multi-purpose carpentry measuring device of the invention can best be understood by a brief discussion of current carpentry measuring techniques. At present, the methods and tools used in basic framing for constructing residential rural housing and interior framing for multiple dwelling and high-rise urban structures consists of up to five levels; a two foot, four foot, six foot level, a line level, and a water level. In combination with these levels, a plumb bob, and a framing square (or carpenter's square) is used to verify relationships of true vertical and true horizontal positions of the various parts of constructing members to themselves where important. For example, when installing a door frame, all parts of the door jambs must be square, or at a perfect 90 degree angle from one another in order that a new door fit properly into the frame, and the frame itself must be plumb front to back, and side to side. In order to achieve that goal now, a plum bob is set at the top of a header, or top horizontal member of the door buck frame for the door. The plumb bob is set by nailing a small nail into the header piece and tying the string around the nail at usually two inches away from the to-be-referenced side of the door buck or vertical member. The distance from the string and the side of the door buck is measured at the top, middle, and bottom of the construction member, and each measurement must be exactly the same in order for the member to be read as plumb or true vertical. The string is also a visual reference to insure that the buck is straight all the way from top to bottom. This process is then repeated on the other side. Once the two vertical members of the frame are determined as plumb, then the header, or top piece to the door frame, must be determined as horizontally level. Normally, this is where a two foot level is used, and theoretically, if the two vertical members of the frame and the header, or top piece of the frame are plumb and level, then they should be square to one another. In other words, the two corners at the top of the door frame should be at a perfect 90 degrees. For this confirmation, a framing square, also known as a carpenter's square, is used. If there are not spaces between the two edges of the square and the two surfaces of the door frame, then it is square. To help better confirm the vertical measurement a four or six foot level is used.

Unfortunately, the precision of measuring with levels and a plumb bob are only as accurate as the average eye can see. Sometimes, the levels are a little off, and other times, vision is impaired due to poor lighting or poor eye sight, and can cause the true vertical read on a level, or read on the measuring tape, to be off by a fraction of an inch which will magnify over the greater distance of the span it is measuring, resulting in the opening being off from top to bottom or side to side. This results in costly re-framing and hanging of doors and windows.

The device of the invention combines the use of the square, the two and six foot levels eliminating the need for using a plumb bob, saving time and making the task physically easier.

By turning the device of the invention into a square, with levels on both arms of the square, the frame is assured of being plumb and square at the same time, and that measurement is read simultaneously. In addition, after checking that plumb and square are true, the invention can be unfolded to make a four foot level and straight edge to verify that the vertical members of the door frame are plumb and straight.

Another very important task in framing, especially for interior renovation and finish carpentry, is establishing bench marks for installing cabinets, paneling, hung ceilings, moldings, closets, etc. A bench mark is a level line drawn around a room usually sixty inches off the floor at given points to establish a level line of reference from floor to ceiling to establish any differences in height in floor and/or ceiling levels so that hanging cabinets and moldings, or hanging ceilings, will be level from one end to another.

Often times, due to sagging structures, the floors and ceiling will have a slope in them that needs to be compensated. For this task, presently, a water level is used, and while this can at times be accurate over long distances from one end or side of a room, the result is often an inaccurate read because of bubbles in the line, bad reading of the water line at either end of the line, or other factors not easily controlled at the time of use. It is also a cumbersome instrument to use on crowded job sites, and requires two people.

With the device of the present invention, when it is unfolded to its extended two, four, or eight foot level position, with the two laser pin lights, one at each end, the device can be secured to a wall and balanced in the level position and left by itself. The laser pin light will spot light each surface to the left and right of the wall the device is affixed to. A mark with a pencil can then establish the points for the next two walls and the wall with the level on it. The device can then be placed on the next wall to the original placement, and the same procedure repeated.

Another important application for the multi-purpose carpentry measuring device of the invention is its use as a bevel gauge. Any angle can be copied with each side measured from 20 inches up to 84 inches on either side of the corner. This allows a more accurate tracing of slopes or non-square angles onto material for cutting and placing, such as sheet rock, plywood sheathing, shelving, and so on.

While angles can be traced using the device of the invention, basic calculations for rise and run, or pitch can also be ascertained. With the addition of the built-in calculator, the total height of a ceiling or stair rise can be calculated. For instance, if the device is placed at the bottom of a stair case with one arm lying parallel to the slope of the stairs, and the other arm positioned level and reads 45 degrees, then dividing 3.75 into 45 degrees will result in 12. This is the number of inches that the stairs rise per every 12 inches that the stairs run forward. Multiply that number by the total number of feet that the stairs run forward, and you get the total rise. The built-in calculator can be programmed to handle specific calculations for framing, as well as dealing with fractions, and the conversion of scales.

Thus, the multi-purpose carpentry measuring device of the invention provides new conveniences and increased accuracy for a wide variety of building construction procedures. Horizontal and vertical determinations are made, angles laid out and measured, bench markings made with laser precision, and calculations conveniently performed, all with hitherto unavailable speed and accuracy.

BRIEF DESCRIPTION OF THE DRAWINGS

FIG. 2 is a side elevation, perspective view of one version of the device of the invention shown in a fully open, 180 degrees position.

FIG. 3 is a sectional view of one version of the device of the invention taken along the line 3—3 of FIG. 2, illustrating the tongue in groove joint connection of the extendible rule on the base of the foot member of the device of the invention.

FIG. 4 is a side elevation, perspective view of one version of the device of the invention showing rotatable levels in the leg member of the invention, indicating the angle subscribed from the horizontal.

FIG. 5 is a side elevation, perspective view of one version of the device of the invention, shown in open, 180 degrees position, with laser pin lights in place at the non-pivoting ends of the foot and leg members of the invention.

FIG. 6 is a plan view of one version of the device of the invention taken along the line 6—6 of FIG. 5, illustrating a pin, for securing the device of the invention to a structure, at the approximate center of the foot and leg members shown in open, 180 degrees position.

FIG. 8 is a perspective view of one version of the invention illustrating the device of the invention as connected to the exterior or a cabinet, with the laser pin light activated and illuminating a bench marker point on an adjacent wall.

DETAILED DESCRIPTION

Figure 1:
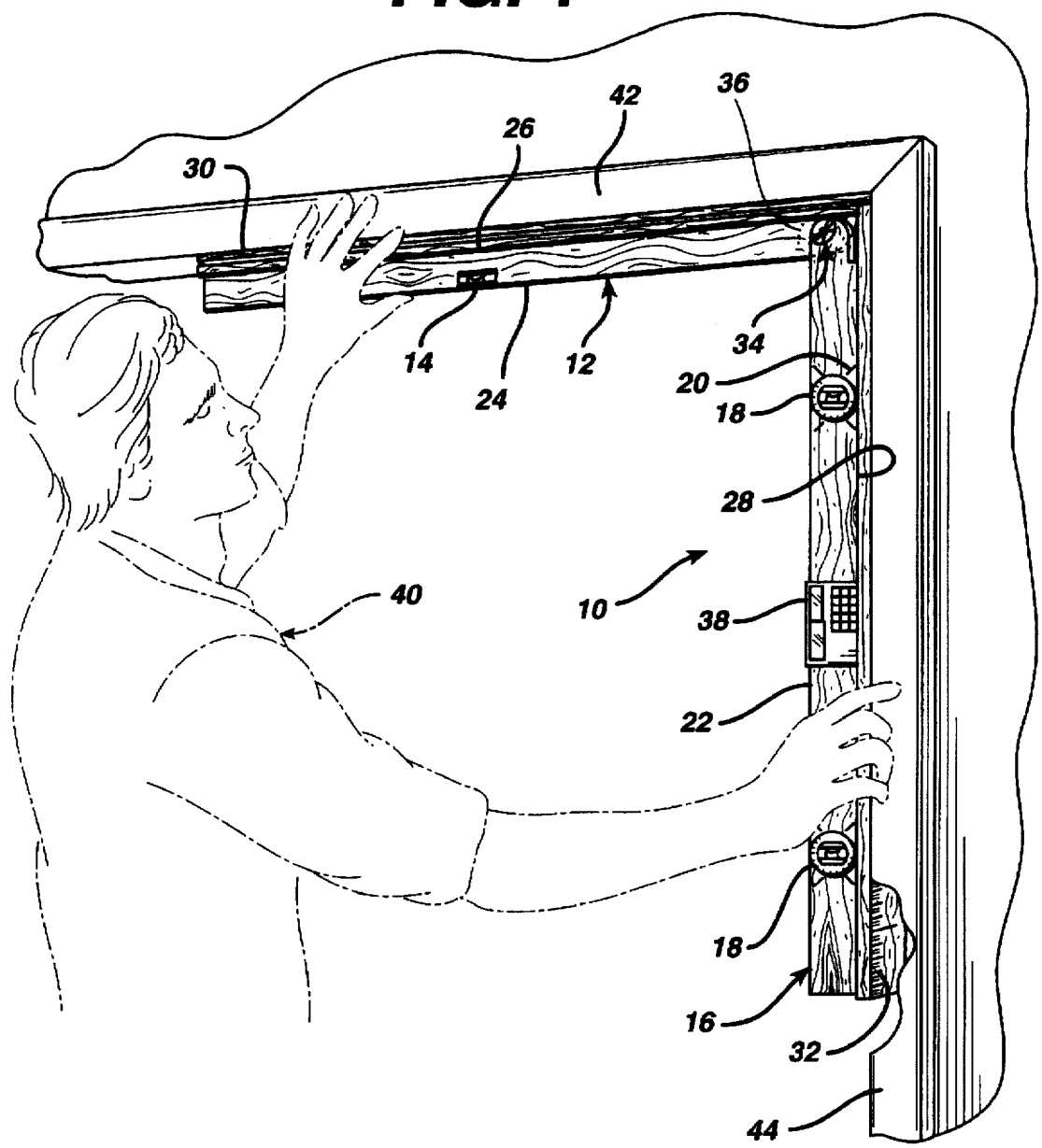
FIG. 1 is a perspective view of one version of the device of the invention being used as a framing square in a door installation.
Figure 7A:
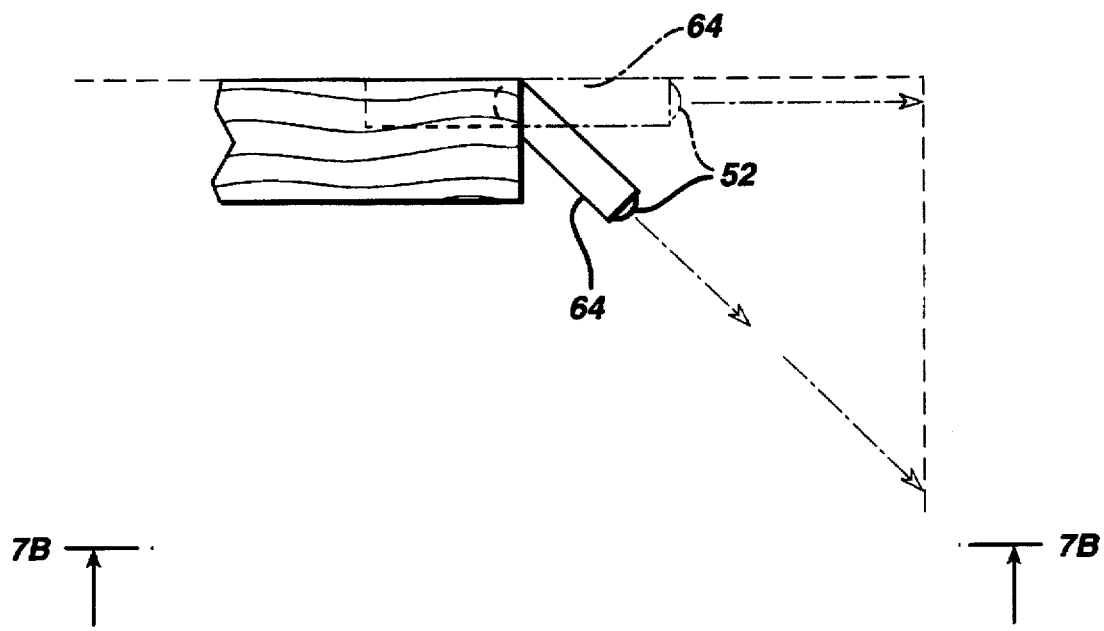
FIG. 7A is a plan view taken along the line 7A—7A of FIG. 5, illustrating a laser pin light at the end of the leg member of one version of the device of the invention.
Figure 7B:
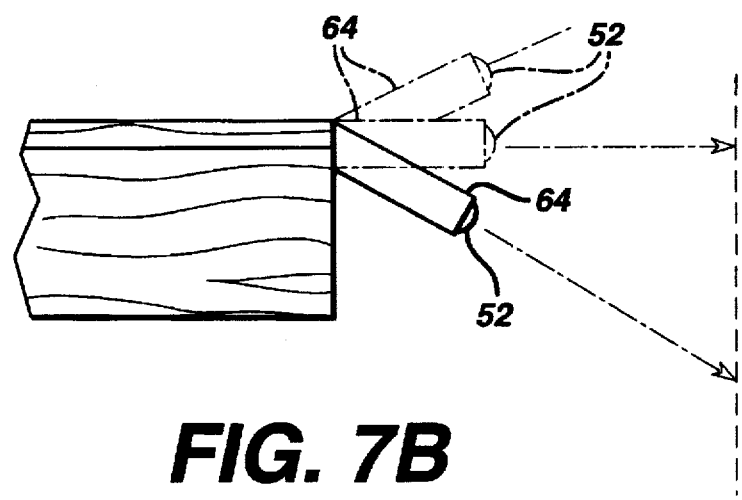
FIG. 7B is an elevation view taken along lines 7B—7B of FIG. 7A.

Referring now to the drawings, a version of the invention 10 is shown being used by an operator 40 as a framing square to insure that a door opening is plumb and square. The multi-purpose carpentry measuring device 10 is shown as manually opened around a connecting pivot 34 to a 90 degree angle. The device of the invention basically consists of two members, a foot member 12 and a leg member 16, connected together at one end of each member by a pivot 34. As shown in the drawings, (FIGS. 3 and 9) the pivot can be a wing nut 46, which provides for maintaining the two members in a planar relationship, and also enables the two members to be secured at any angle from a closed (FIG. 4) 0 degrees to a fully open (FIG. 2) 180 degrees. The two members are configured to be joined together at the pivot 34 at a maximum of 180 degrees in a planar relationship in the fully open (FIG. 2) position. Typical approximate dimensions for a two foot version of the device 10 would be a foot member being 24" in length, with a flat base portion 26 measuring 1¼" inches wide, the base 26 being contiguous with an upstanding side wall 24 measuring ½" wide by 1¾" in height above the base 26. The leg member 16 has similar dimensions, with a flat base portion 28 contiguous with an upstanding side wall 22.

The foot and leg members are configured so as to be able to fit together (FIG. 4) to form a substantially rectangularly shaped, elongated box-like structure. The rectangular structure can be manually opened and secured at any angle subscribed by the pivot and the two members between 0 degrees and 180 degrees in a planar relationship between the two members. The device 10 can be fabricated in plastic, but preferable materials of construction are metals, such as steel or aluminum, or wood. The foot member 12 has a bubble tube 14 fixedly inset at approximately the center of its length, so as to act as a level for determining a horizontal position, while the leg member 16 has at least one and preferably two bubble tubes 18 inset along its length so as to act as a level for determining a vertical (perpendicular) position. The bubble tube(s) in the leg member can be rotatably inset so that they can be positioned vertically or horizontally, depending on intended use. Or, the bubble tubes can be manually rotated to determine any angle (FIG. 4) between the foot and leg members as determined by angle gauge calibration markings 20 immediately adjacent the bubble tube(s) 18. The pivot 34 is also immediately adjacent angle gauge calibration markings 36 as a further convenience in noting the angle subscribed between the foot and leg members.

As illustrated in FIG. 1, an operator has positioned the device 10 between a door header 42 and a door buck frame 44 so that the door frame can rapidly and conveniently be determined to be perfectly square at precisely a 90 degree angle as determined by the bubble tube 14 in the foot member 12 and the bubble tube(s) 18 in the leg member, and the calibrations for both the pivot 34 and the calibrations 20 for the leg bubble tube(s). A calculating machine or calculator 38 can be affixed to the leg member, the calculator 38 being programmed to handle specific construction equations, and having frequently used conversion scales, for added convenience to the construction professional.

In FIG. 2, the device 10 is shown in the fully open position, with a wing nut 46 (FIG. 3) acting as the pivot and securing the foot and leg members in this fully open position. With the rotatable bubble tube(s) 18 in the leg member set for horizontal level determinations, the device 10 can be used as an extended level for horizontal readings. The device can also be used as an elongated straight edge, or set in a vertical position with the bubble tube(s) 18 in the leg member rotated for a perpendicular level reading to verify, for example, that the door frame 44 of FIG. 1 is plumb and straight. The usefulness of the device is further increased by adding a rule to one or both members of the device. As depicted in FIG. 2, a first rule 30 is shown affixed to the flat base 26 of the foot member, and a second rule 32 is shown affixed to the flat base 28 of the leg member. Both rules have a tongue portion 48 (FIG. 3) which slides within a groove portion 50 (FIG. 3) on both the foot and leg flat base portions, yielding a convenient tongue and groove joint for both rules. The rules 30, 32 are approximately the same length as the flat base portion of the members to which they are attached, and can be manually caused to slide out extendibly either to the left or right of the fully open device 10 depicted in FIG. 2. And, of course, the rules can be extended to selected spaced distances by an operator in any relative angle of the two members between 0 degrees and 180 degrees.

FIG. 4 shows the device in fully closed position, with both the foot and leg members fitted together to give a unitary appearance. This position illustrates the convenience of having the bubble tube(s) 18 in the leg member rotatable over a full 360 degrees, with convenient adjacent angle gauge calibration markings 20 so that the device can be used for a rapid determination of an angle with a given flat surface.

FIGS. 5-8 illustrate an important new convenience achievable with the device 10 of the invention when a laser pin light 52 is built into the device. A retractable and pivotable laser pin light holder 64 and laser pin light are affixed to either the end of the foot member opposite the pivot 34, or the end of the leg member opposite the pivot. Or, two laser pin lights may be employed simultaneously, each connected as described to opposite ends of the device. The laser pin light 52 can be operated from a line cord connected to a standard 115 VC, A.C. outlet, or more conveniently operated from a battery (not shown) affixed to the device 10. The laser pin light holder 64 can be retracted when not in use so as not to extend beyond the length of either member. When required, the holder simply pulled forward for illuminating a spot on a wall up to 100 feet away. The holder 64 may also be pivoted at 45 degree angles in the same plane while the holder 64 is in extended, operable position so as to enable an operator to spot light several walls from the one position, or up or down at 45 degree angles from this plane. The laser pin light is collinear with the point of the pin 62 which is retractably affixed at the center of the device 10, as measured while the device is in fully open position. FIG. 8 illustrates utilizing this pin 62 to mount the fully extended device below a shelf extension 68 of a cabinet 66 so as to be able to make a pencil mark 70 for the exact height of this shelf on adjacent walls with laser precision.

Figure 9:
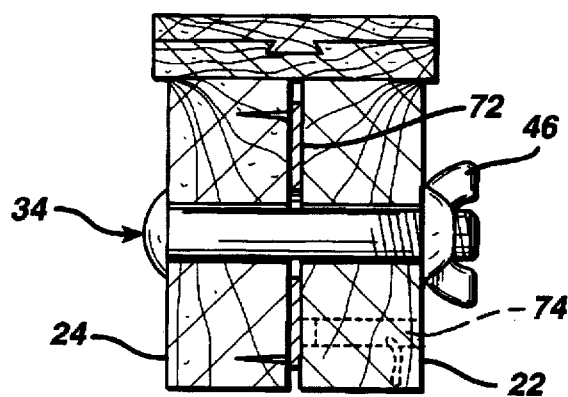
FIG. 9 is a sectional view of one version of the device of the invention, taken along the line 9—9 of FIG. 5 showing a wing nut acting as the pivot, with a magnetic disc connected to the foot member at the pivot end of the member with an optical bar code reader in place at the pivot end of the leg member of the device of the invention.
Figure 10:
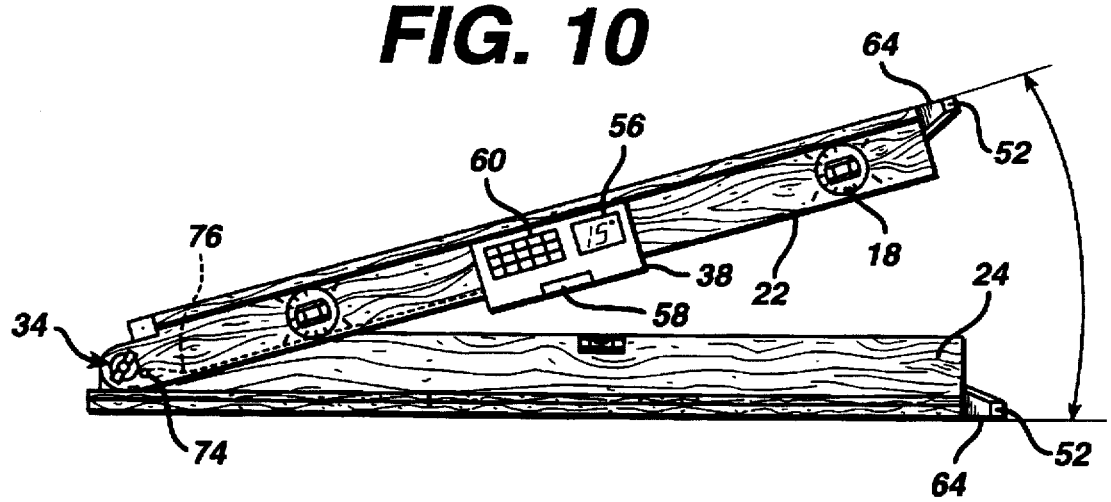
FIG. 10 is a side elevation, perspective view of one version of the device of the invention, showing the foot member in a horizontal position with the leg member indicating a 15 degree angle digital read out on the calculator.

FIGS. 9 and 10 best illustrate another important new convenience that can be incorporated into the device 10 of the invention for rapid and accurate determination of angles when the device is employed as a bevel gauge. As shown in FIG. 9, a magnetic disc 72 is affixed to the foot member at the pivot 34 area of this member. An optical bar code reader 74 (FIG. 9—dotted lines) is connected electrically by a wire 76 to the calculator 38. When the calculator is activated, motion of the leg member relative to the foot member will cause the optical bar code reader 74 to detect angular information encrypted on the magnetic disc 72, which angular deviations will then be displayed in a digital display window 56 on the calculator 38. In addition, the calculator has a magnetic bubble level indicator 58 similarly electrically connected to the calculator which will give a digital readout of the orientation of the leg member relative to true level. The angular information is instantly observed by an operator who can then make use of the information using the keyboard 60 on the calculator to determine the rise and run, pitch, and so on.

The laser pin light 52, its holder 64 and the mechanism of operation of the pin light 52 and holder 64 are conventional. The magnetic disc 72 encrypted with an angular bar code, together with the optical bar code reader 74 are conventional devices. The calculator 38, together with its built-in specific programs and magnetic bubble level indicator are also conventional, and well known to the art.

Thus, the multi-purpose combination carpentry measuring device of the invention provides a unique tool for aiding the construction professional in a variety of important tasks. A single tool now provides fast and accurate level, framing, plumb, angle, and level bench mark information. Aided by the built-in, programmed calculator, all of this accurate information is available for immediately performing the host of calculations routinely required.

While the present invention has been disclosed in connection with preferred versions shown and described in detail, various modifications and improvements thereon will become readily apparent to those skilled in the art. Accordingly, the spirit and scope of the present invention is to be limited only by the following claims.

What is claimed is:

1. A combination level, straight edge, framing square, bevel gauge, and plumb measuring, carpentry measuring, device comprising:

(a) a first straight member and a second straight member, said members being substantially greater in length than width and height;

(b) said first member and said second member being connected together at a pivot in a planar relationship at one end of each of said members;

(c) said first member and said second members being configured so as to fit together when manually rotated about said pivot in said planar relationship to a closed position by a user of said device;

(d) said first member and said second member being configured so as to limit the degree either member can pivot relative to the other member from said closed position in said planar relationship;

(e) said first member having a bubble tube fixedly located a spaced distance along said length of said first member so as to indicate when said first member is in a horizontal level position;

(f) said second member having at least one bubble tube rotatably affixed to it, said bubble tube having means for being manually rotated in an angular arc, said second member bubble tube being located a spaced distance along the length of said second member and, (g) a laser pin light affixed to at least one end of one of said members, said laser pin light held in a holder, said holder being retractable so as not to extend beyond the length of said member, said holder having means for moving to a forward position in said planar relationship beyond the length of said member, said holder in said forward position being capable of being pivoted at 45 degree angles up and down, and left and right in said plane of said planar relationship.

2. The combination carpentry measuring device according to claim 1 wherein said first member and said second member having a top portion, a flat base portion, and upstanding side walls; and at least one of said base portions of said members having a rule affixed to it, said rule and said base having means for permitting said rule to be moved a spaced distance beyond the length of said member in the same plane as said planar relationship, thereby increasing the effective length of said member.

3. The combination carpentry measuring device according to claim 2 wherein said means for permitting said rule to be moved a spaced distance beyond the length of said member is a tongue in groove joint in said rule and said member.

4. The combination carpentry measuring device according to claim 1 wherein said pivot has means for maintaining said first and second members at any planar angular relationship to one another in said planar relationship between 0 degrees and 180 degrees.

5. The combination carpentry measuring device according to claim 4 wherein said means for maintaining said first and said second members in said planar relationship between 0 degrees and 180 degrees is a wing nut.

6. The combination carpentry measuring device according to claim 4 further comprising angle gauge calibration markings on said second member immediately adjacent said pivot.

7. The combination carpentry measuring device according to claim 4, further comprising angle gauge calibration markings surrounding said arc around which said bubble tube can be rotated.

8. The combination carpentry measuring device according to claim 7, further comprising a calculator being affixed to one of said members.

9. The combination carpentry measuring device according to claim 8, further comprising a magnetic disc being affixed to said first member immediately adjacent said pivot, and an optical reader being affixed to said second member immediately adjacent said pivot, said optical reader and said magnetic disc being electrically connected to said calculator, so that when said calculator is activated to detect angular deviations of said first member and said second member relative to one another in said plane of said planar relationship said optical reader reads said deviations encrypted on said magnetic disc, and said angular deviation is then displayed on a window display portion on a face portion of said calculator.

10. The combination carpentry measuring device according to claim 9, further comprising a magnetic bubble tube level indicator affixed to said calculator, said magnetic bubble tube level indicator being electrically connected to said window display on said calculator, so that the orientation of said second member relative to a position considered to be true level is digitally displayed on said display window when said calculator is activated to receive orientation information from said magnetic bubble tube level indicator.

11. The combination carpentry measuring device according to claim 1, further including a mounting pin, the point of said pin being collinear with said laser pin light when said laser pin light is projecting a laser light in the same plane as said planar relationship of said members, said pin providing the means for positioning said device on a structure so that said device maintains itself in a desired position.

* * * * *